(12) United States Patent
Galindo Rosales et al.

(10) Patent No.: US 10,443,678 B2
(45) Date of Patent: Oct. 15, 2019

(54) COMPOSITE LAYER MATERIAL FOR DAMPENING EXTERNAL LOAD, OBTAINING PROCESS, AND USES THEREOF

(71) Applicant: UNIVERSIDADE DO PORTO, Oporto (PT)

(72) Inventors: Francisco José Galindo Rosales, Oporto (PT); Laura Campo Deaño, Oporto (PT)

(73) Assignee: UNIVERSIDADE DO PORTO, Oporto (PT)

( * ) Notice: Subject to any disclaimer, the term of this patent is extended or adjusted under 35 U.S.C. 154(b) by 273 days.

(21) Appl. No.: 15/514,991

(22) PCT Filed: Sep. 25, 2015

(86) PCT No.: PCT/IB2015/057399
§ 371 (c)(1),
(2) Date: Mar. 28, 2017

(87) PCT Pub. No.: WO2016/051320
PCT Pub. Date: Apr. 7, 2016

(65) Prior Publication Data
US 2017/0211654 A1    Jul. 27, 2017

(30) Foreign Application Priority Data

Sep. 29, 2014 (PT) .......................... 107926

(51) Int. Cl.
*F16F 15/023* (2006.01)
*A42B 3/12* (2006.01)
*F16F 9/00* (2006.01)
*F16F 9/30* (2006.01)

(52) U.S. Cl.
CPC ............ *F16F 15/023* (2013.01); *A42B 3/121* (2013.01); *F16F 9/003* (2013.01); *F16F 9/30* (2013.01)

(58) Field of Classification Search
CPC .................................................... F16F 15/023
USPC ........................................................ 428/188
See application file for complete search history.

(56) References Cited

U.S. PATENT DOCUMENTS

| 5,679,439 A | 10/1997 | Schmidt et al. |
| 6,052,992 A | 4/2000 | Eroshenko |
| 6,701,529 B1 | 3/2004 | Rhoades et al. |
| 8,091,692 B2 | 1/2012 | Deshmukh et al. |
| 2004/0173422 A1 | 9/2004 | Deshmukh et al. |
| 2005/0266748 A1 | 12/2005 | Wagner |

(Continued)

FOREIGN PATENT DOCUMENTS

| EP | 1002008 A1 | 5/2000 |
| WO | WO 1998/023179 A1 | 6/1998 |

(Continued)

*Primary Examiner* — Brent T O'Hern

(57) ABSTRACT

The present disclosure relates to the customization of a composite layer material for absorbing or dissipating mechanical energy under impacts or vibrations. The composite layer material comprises at least a support layer of a resilient material, said support layer having recessed fluid-tight microchannels comprising a fluid, wherein the channel section and fluid viscosity is such to dampen the external load by the constricted fluid flow through said microchannels. Therefore, the present disclosure relates to a maximization of safety and/or comfort.

19 Claims, 7 Drawing Sheets

(56) References Cited

U.S. PATENT DOCUMENTS

2006/0234572 A1 10/2006 Wagner et al.
2014/0259326 A1 9/2014 Carlson

FOREIGN PATENT DOCUMENTS

| WO | WO 2008/048703 A2 | 4/2008 | |
| WO | WO-2008048703 A2 * | 4/2008 | ............. F41H 7/042 |
| WO | WO 2015/128699 A1 | 9/2015 | |

* cited by examiner

COMPOSITE LAYER MATERIAL FOR DAMPENING EXTERNAL LOAD, OBTAINING PROCESS, AND USES THEREOF

CROSS-REFERENCE TO RELATED APPLICATIONS

This application is a U.S. National Stage Application under 35 U.S.C. § 371 of International Patent Application No. PCT/IB2015/057399, filed Sep. 25, 2015, which claims priority to Portugal Application No. 107926, filed Sep. 29, 2014, which are hereby incorporated by reference in their respective entireties

TECHNICAL FIELD

The subject matter of the present disclosure relates to the customization of a composite layer material for absorbing or dissipating mechanical energy under impacts or vibrations to maximize safety and/or comfort. The composite layer material is customized based on the combination of the mechanical properties of a resilient solid material, the rheological properties of a complex fluid and the geometrical configuration of a microfluidic network.

The present disclosure relates, in particular with an energy absorbing or dissipating structure comprising of a sheet of solid material engraved/carved/stamped/incised with an optimized network of microchannels, which are filled with a deliberately chosen complex fluid and closed tightly it with another sheet of solid material.

BACKGROUND

Preventing damage or discomfort resultant from impacts or vibration is a ubiquitous problem in our society and there is an increasing need for advanced energy absorbing materials. Cellular materials, e.g. expanded polystyrene (EPS) are typically used for these purposes, depending the choice on the application itself. The majority of these materials deform by crushing, developing a permanent deformation and limiting their use to just one.

In the last decade Shear Thickening Fluids (STFs), which are a particular type of complex fluids, have attracted the attention of the industry for the fabrication of passive dissipative devices, such as vibration absorbers and ballistic and stab resistant fabric composites, due to their viscosity increase with the applied shear stress over a critical value. Additionally, these liquids do not require an external activation mechanism, as magneto-rheological or electro-rheological fluids do, since they just activate under stress. Moreover, the increase in the viscosity can be tailored for the specific application by choosing properly the components of the STF. All this has led to a considerable interest in incorporating STFs into other materials in order to obtain energy absorbing composites possessing a combination of their best properties/characteristics. In some prior approaches, STFs were encapsulated into sealed bags, with syntactic glass beads for weight reduction (US 2005/0266748 A1); or incorporated into solid phase elastomers (US 2006/0234572 A1).

As the rheological response of STFs is greatly affected by the deformation rates at which it is undergone, what depend directly on the local geometry and the applied forces, other inventions propose energy-absorbing composites with STFs based on the interaction between the fluid and the geometry which confines it. Fluid-impregnated material consisting of a porous interconnected network of solid material forming edges and faces of cells, preferably an open-cell reticulated or partially closed-cell foam, or formed from fibers or other cellular solids (U.S. Pat. No. 8,091,692 B2), where the tortuosity of the passageways subjects the STF to a complex flow under confinement. Thus, the addition of STFs to the porous media increases their energy absorption capabilities, due to the contribution of the viscous work done by expelling the fluid from inside the cells of the foam, which is added to the energy dissipated due to the elastic, plastic, and buckling modes that occur during compression of the scaffold material. Alternatively to the impregnated foams, other approach consisted of two outer layers containing reservoirs or chambers of STF separated by a shear layer including a lattice structure defining straight shear paths between the first and second outer layers (US 2014/0259326 A1). Finally, another invention comprised two pieces of solid material disposed in a superimposed relationship, configured so as to define a plurality of chambers there between as well as a plurality of fluid flow channels, which is in fluid communication with two of the chambers; in this way, when the applied impact exceeds the predetermined sealing level, the seals close off the chambers from the fluid channels converting the material to an closed cell structure (WO 98/23179 A1).

It has been reported recently that STFs enhance their shear thickening behaviour when sheared under confinement, i.e. when flowing through tiny channels. Microfluidics is the science and technology of devices and methods that process, control or manipulate very small amounts of fluid by using channels with characteristic length-scales less than a millimeter. Due to the numerous advantages, microfluidics have stimulated remarkable interest and unravelled an extensive range of applications, from biotechnology to enhanced oil recovery.

These facts are disclosed in order to illustrate the technical problem addressed by the present disclosure.

General Description

The present disclosure relates to energy absorbing composites comprising a resilient solid material, a numerically optimized closed microfluidic networks, and a complex fluid, either VEFs or STFs. The present disclosure is able to absorb or dissipate energy resulting from impacts or vibrations without the need to rely on magneto-rheological or electro-rheological fluids.

Energy absorbing composites are made up of distinct components, elements, or parts, and combining their essential or typical with the aim of absorbing or dissipating external kinetic energies in larger amounts than their separate identities. In the particular case of the present disclosure one component consists of a resilient solid material and the other component consists of a complex fluid, embedded into the previous one by means of optimized microfluidic networks.

Resilient solid material may be, for example, microagglomerated cork, expanded polystyrene (EPS), expanded polypropylene (EPP), ethylene vinyl acetate (EVA), etc.

Cork is a natural cellular material that is recently being considered for its use in lightweight structural and energy-absorbing applications due to cork is capable of absorbing considerable amounts of energy with almost total reversibility useful for the repeated absorption of impact energy. Micro-agglomerated cork is produced out of waste cork coming from the production of stoppers. Cork granules with particle size below 1 mm are bonded to each other either by activating their natural resins (pure agglomerated cork) or by coating the granules with a thin layer of an additional adhesive agent (compound agglomerated cork). Thus micro-agglomerated cork exhibits more homogeneous properties and greater variety of geometries than its natural form.

Expanded polystyrene (EPS) is a rigid and tough, closed-cell foam. It is usually white and made of pre-expanded polystyrene beads. EPS is used for many applications e.g. trays, plates, bowls and fish boxes. Other uses include molded sheets for building insulation and packing material ("peanuts") for cushioning fragile items inside boxes.

Expanded polypropylene (EPP) is a highly versatile closed-cell bead foam made of polypropylene. EPP has very good impact characteristics due to its low stiffness; this allows EPP to resume its shape after impacts.

Ethylene-vinyl acetate (EVA), also known as poly(ethylene-vinyl acetate) (PEVA), is the copolymer of ethylene and vinyl acetate. Ethylene vinyl acetate (EVA) is the copolymer of ethylene and vinyl acetate. It's an extremely elastic material that can be sintered to form a porous material similar to rubber, yet with excellent toughness.

A complex fluid (also known as non-Newtonian fluid) is a fluid that exhibits a stress-strain rate relationship that does not follow the linear Newton's law of viscosity. Complex fluids do also not follow Hooke's law of elasticity, the relationship between stress and deformation that is used for elastic materials.

A viscoelastic fluid (VEF) is a particular type of complex fluid VEFs which viscosity typically diminishes under shear (shear thinning behaviour); but when the applied load is removed, the stress inside the VEF does not instantly vanish and the internal molecular configuration of the fluid can sustain stress for some time (relaxation time).

A shear thickening fluid (STF) is a particular type of complex fluid with increasing viscosity and normal force when is undergone to a shear stress over a critical value. This critical value depends on the particular formulation of the fluid. If the STF is made of colloidal particles, then the onset of the shear thickening fluid will depend on the particle size, particle shape and volume concentration.

Microfluidic network is meant as a network of channels with characteristic length-scales less than one millimeter.

The use of microfluidic network for embedding the complex fluids into the resilient solid material introduces several major advantages with regards to the strategies implemented in the art:
- reduced amount of fluid, which is crucial for applications in which lightweight is crucial, for example sporting equipment such as helmets, helmet liners, ballistic equipment, clothing, cushioning bodies;
- enhanced rheological response of the STFs and VEFs;
- optimized geometry of the fluid passageways, in particular microchannels;
- allows to obtain an optimized energy absorbing composite with the required energy absorbing properties for any particular application, saving in this way weight and volume with regards to other current technical solutions.

The geometry of the energy absorbing composites can be either 2D or 3D, depending on the preferred fabrication technique and the scaffold material. Thus, the simplest embodiment comprises of a laminar sheet of a resilient solid material, either engraved/carved/stamped/incised with an optimized network of microchannels, filled with a complex fluid and closed tightly with another sheet of solid material, as disclosed in FIG. 1. Thus the mechanical properties of the energy absorbing composite result from the combination of the mechanical properties of the solid material and the enhanced response of the complex fluid flowing through the network of microchannels, as well as the fluid-structure interaction.

Microfluidics is particularly interesting for this disclosure because of the reduced amounts of fluid sample needed and the possibility of producing highly integrated devices able to mimic porous media. Moreover, the geometric features microchannels can be numerically optimized in order to get the intended flow characteristics. Additionally, non-Newtonian fluids in general and viscoelastic fluids (VEFs) in particular, when flowing through microchannels increase significantly the relevance of fluid elasticity and, therefore, the flow resistance can be significantly different from those of their Newtonian counterparts at low Reynolds number, particularly if the microchannels are designed especifically for that purpose, as it is the case of the microfluidic rectifiers. This latter feature opens the door to the use of VEFs to develop energy absorbing composites, which is an advancement in the art.

The prior art presents several disadvantages when comparing with the present disclosure as:
- none of the strategies for fabricating STF-composites implemented in the prior art takes advantage of the fact that confinement enhances the response of STFs;
- none of the already disclosed prior art considers the possibility of using VEFs for the development of energy absorbing composites;
- none of prior art considers the possibility of using computational techniques to optimize the fluid passageways, in particular microchannels, in order to maximize the safety and comfort of the composite and control the amount of energy absorbed or dissipated by the composite.

Therefore a new line of technology is required to produce customized energy absorbing materials reinforced with complex fluids.

There is disclosed herein a technology for developing optimal and customized energy absorbing composites based on the combination of the mechanical properties of a resilient solid material, in particular microagglomerated cork, EPS, EPP, EVA and the rheological properties of complex fluids, in particular VEFs or STFs, embedded in the solid material by means of a numerically optimized microfluidic network.

These energy absorbing composites may be employed as a component of helmet liner, cushioning body or other such protective structure to prevent damage or discomfort from external mechanical dynamics, such as impacts or vibrations. Additionally, this technology may allow certain resilient solid materials, in particular microagglomerated cork, to accomplish the standards of certain applications (like helmet liner for motorcyclists, EN1621-1 and EN1621-2).

In an embodiment, the energy absorbing material now disclosed may comprise at least one support layer.

In an embodiment, the energy absorbing material may comprise two laminar sheets, or two layers, of a resilient solid material. The first layer may be a support layer and it may be embedded with an optimized network of microchannels and filled with a complex fluid, while the second layer may be closed tightly with the support layer.

In an embodiment, the geometry of the microfluidic network may result from a numerical optimization process, which will take into consideration the dynamics of the external mechanical input, either impact or vibration, the rheology of the complex fluid and the mechanics of the solid material (fluid-structure interactions).

In an embodiment, there is no need for having chambers or reservoirs of the fluid in the network and there is also no need for having parts disposed in a superposed relationship, like in the disclosure disclosed at US 2014/0259326 A1 and WO 98/23179 A1, respectively.

In an embodiment, the technology to embed the microfluidic channel on the solid material may depend on the nature of the solid material selected, in particular laser engraving may be used on microagglomerated cork; while micro-milling may be more adequate for EPS or EPP.

In an embodiment, the filling process of the microfluidic network with the complex fluid will also depend on the rheological properties of the fluid, in particular in the case of VEFs, the two sheets of solid material may be glued before filling the microfluidic network, and then the fluid can be infused into the microchannels.

In an embodiment, the filling process of the microfluidic network with the complex fluid will also depend on the rheological properties of the fluid, in particular in the case of STFs, the fluid can be spread onto the sheet embedded with the microfluidic network, filling the microchannels and then, bonded to the other sheet of solid material.

In an embodiment, the support layer comprises a closed cell foam structure.

In an embodiment, when the composite is subjected to an impact above a certain level, the outer sheet of solid material is deformed, part of the microfluidic channels are compressed and the fluid expelled out; then, the fluid is accelerated and the shear thickening behaviour (in the case of using a STF) or the elastic instabilities (in the case of using a VEF) will be triggered; and the energy of the impact will be absorbed and dissipated to the maximum by the combined effect of the solid material, the complex fluid and the fluid-structure interaction.

In an embodiment, then the composite is subjected to a vibration above a critical level, the complex fluid will activate, either shear thickening behaviour or elastic instabilities for STFs and VEFs, respectively, and, subsequently, part of the energy from the vibration will be dissipated by the combined effect of the complex fluid (sort of viscous damping), the solid material (hysteric damping) and the fluid-structure interaction.

The present disclosure also relates to a composite layer material for dampening external dynamic load comprising at least a support layer of a resilient material, said support layer having recessed fluid-tight microchannels comprising a fluid, wherein the microchannel section and fluid viscosity is such to dampen the external dynamic load by the constricted fluid flow through said microchannels.

In an embodiment, the fluid is a shear thickening fluid, a viscoelastic fluid, and combinations thereof.

In an embodiment, the external dynamic loads are impact and/or vibrations.

In an embodiment, the microchannels may be interconnected.

In an embodiment, the support layer comprises recessed fluid-tight pockets interconnected with said microchannels.

In an embodiment, the composite may further comprise a second layer placed over said microchannel and/or pockets for the retention of said fluid.

In an embodiment, the microchannels may extend in two planar directions of the support layer.

In an embodiment, the composite may comprise a plurality of support layers, in particular 2, 3, 4, 5 or more support layers.

In an embodiment, the microchannels may be engraved microchannels, carved microchannels or stamped microchannels.

In an embodiment, the microchannels and pockets may comprise a depth between 0.01 a 10 mm, preferably between 0.1 a 1 mm.

In an embodiment, the microchannels may comprise a width between 0.01 a 10 mm, preferably between 0.1 a 5 mm.

In an embodiment, the viscosity of the fluid may be between $10^{-3}$ a $10^4$ Pa s at 20° C.; and the density of the fluid may be between 800 a 2000 kg/m$^3$ at 20° C.

In an embodiment, the shear thickening fluid may be selected from a list consisting of concentrated dispersions of: corn starch, precipitated calcium carbonate, aerosil, fumed silica, silica and mixtures thereof, and others.

In an embodiment, the viscoelastic fluid may be selected from a list consisting of concentrated solutions of: polyacrylamide, polyethylene oxide, polyisobutylene, mixtures thereof, and others.

In an embodiment, the composite comprises an impermeable resilient solid material, which may be selected from a list consisting of cork, expanded polystyrene, expanded polypropylene, ethylene vinyl acetate, combinations thereof, and others.

In an embodiment, the resilient material may be an agglomerated material, in particular agglomerated cork.

In an embodiment, the agglomerated cork may comprise a granule size between 0.1 a 5 mm.

In an embodiment, the support layer of the composite may comprise a thickness between 1 a 10 mm, preferably 2 a 5 mm.

In an embodiment, the second layer of the composite may comprise a thickness between 0.1 a 10 mm, preferably 1 a 2 mm.

In an embodiment, the second layer of the composite may further comprise an adhesive.

The present disclosure also relates to shin guards, elbow guards, helmets, knee pads, body armours, insoles, anti-vibration pads, anti-vibration gloves, anti-vibration mats, anti-vibration mounts, acoustic isolator or any other vibration or shock/impact isolator comprising the composite layer material previously described.

Throughout the description and claims the word "comprise" and variations of the word, are not intended to exclude other technical features, additives, components, or steps. Additional objects, advantages and features of the present subject-matter will become apparent to those skilled in the art upon examination of the description or may be learned by practice of the invention. The following examples and drawings are provided by way of illustration, and they are not intended to be limiting of the present subject-matter. Furthermore, the present subject-matter covers all possible combinations of particular and preferred embodiments described herein.

BRIEF DESCRIPTION OF THE DRAWINGS

The following figures provide preferred embodiments for illustrating the description and should not be seen as limiting the scope of disclosure.

DETAILED DESCRIPTION

Figure 1:
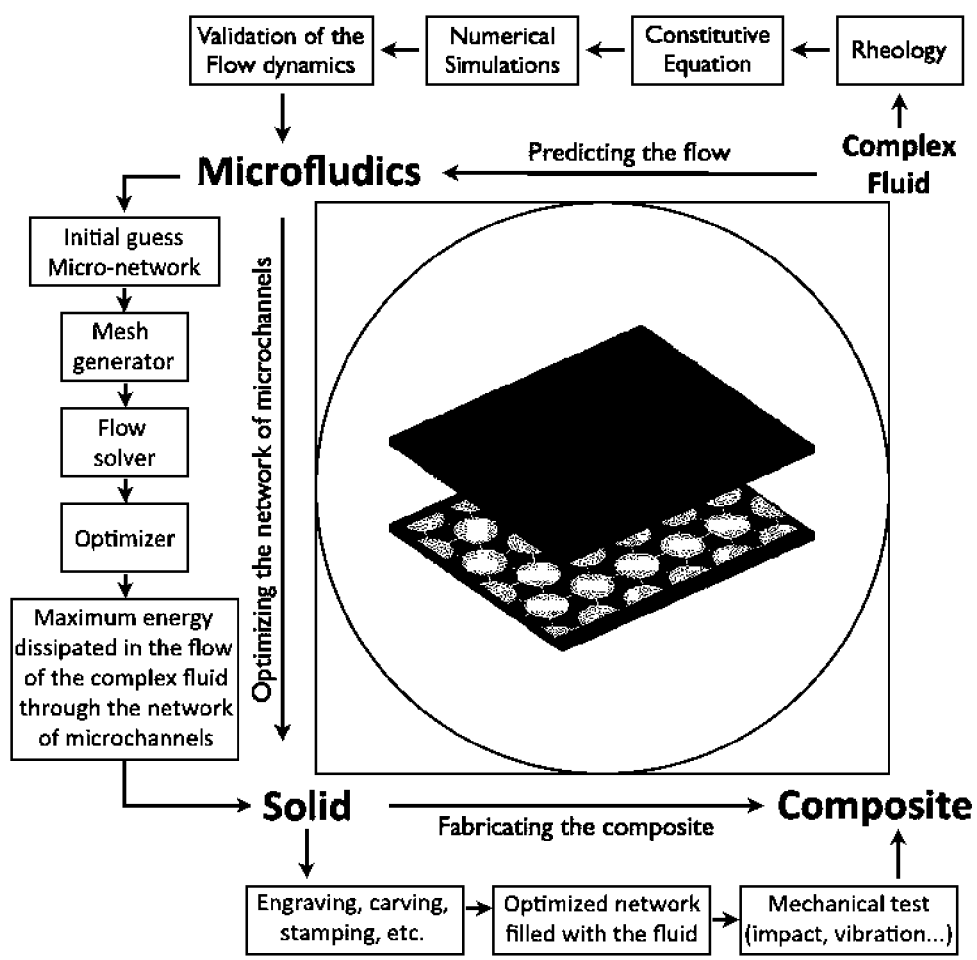
FIG. 1 is a schematic representation of the work-flow to produce composites reinforced by complex fluids and microfluidics networks based on the technology described herein.
Figure 2:
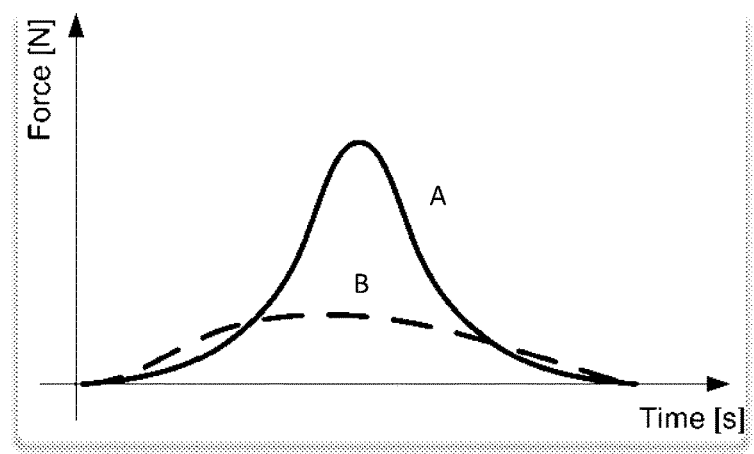
FIG. 2 is a graph depicting a comparison for the force-time curve corresponding to the response of a solid material and a composite developed by means of the present technology using the same solid material when undergone to an external impact wherein A represents a solid material and B represents a composite.

The present disclosure provides a technology to develop optimal and customized energy absorbing composites based on the combination of the mechanical properties of a resilient solid material and the rheological properties of complex fluids, such as VEFs or STFs encapsulated in the solid material by means of a numerically optimized microfluidic network or pattern, as depicted in FIG. 1. As a consequence, the composite developed by means of this technology will be able to minimize the damage or discomfort of a certain kinetic input, either impact or vibration. In this way, when subjected to an impact, the optimized composite will exhibit as a response an improved force-time curve with regards to the response of the sole solid material (FIG. 2), since the peak force has been reduced and the time has been enlarged.

The external kinetic input ($E_{impact}$) is the energy that should be dissipated by the protective composite. In general, in the case of composites reinforced by a complex fluid and a microfludics network, it is aimed at the dissipation of the impact energy by the work of the solid component, the work of the complex fluid and the work of the fluid-structure interaction, hereafter known as FSI (Eq. 1):

$$E_{impact} = W_{liquid} + W_{solid} + W_{FSI}, \quad (1)$$

where the $W_{solid}$ can be estimated as in Eq. 2:

$$W_{solid} = \frac{1}{2} \cdot \frac{E}{3(1-2u)} \cdot \delta H^2 + W_{plasticity}, \quad (2)$$

where E is the modulus of elasticity, ν is the Poisson's ratio and δH is the deformation of the solid within the elastic limit. If it is intended to design reusable composites, then their design should be done within the limit of elasticity and consider $W_{plasticity} = 0$. Eq.2 is correct for the cover sheet of solid material. Nevertheless, it would be more complicated for the sheet of solid material in which the microfludic network will be embedded. In the latter, the mechanical performance will be diminished as part of the solid material has been removed and the presence of jagged edges. Therefore, the fluid contribution to the dissipation of the energy should also compensate this fact.

$W_{liquid}$ is associated with the energy dissipated by the liquid due to the viscosity, the elasticity and the normal forces characteristics of the complex fluid and is given by Eq. 3:

$$W_{liquid} = W_{Visco} + W_{elastic} + W_{Fn} \quad (3)$$

Under an impact, the microchannels under the affected zone will be compressed ($\delta H$ is length of compression of the composite), and therefore the fluid within the microchannels will be expelled out at a flow rate $Q=\text{vol}/\delta t$, where $\delta t$ is the duration of the impact. $W_{visco}$ is associated with the viscous dissipation of the energy due to the viscous pressure drop associated with the flow of the fluid through the microchannels:

$$W_{visco} = \Delta P_{visco} \cdot Q \cdot \delta t; \quad (4)$$

$W_{elastic}$ is associated with the extra pressure drop associated with the elastic behaviour of the complex fluid flowing through the microchannels $W_{elastic} = \Delta P_{elastic} \cdot Q \cdot \delta t$, which can be up to $12 \times W_{visco}$ for viscoelastic fluids if the right geometry is considered; $W_n$ is associated with the energy dissipated by the normal forces of the complex fluid in the zone of the impact $W_{Fn} = N \cdot \delta h$, where the normal forces depend on the normal stresses and the area of application $N = \tau_{zz} \cdot A$, but can reach easily up to 2000 N.

Finally, $W_{FSI}$ is associated with the dissipation of the energy associated with the deformation of the microchannels due to the flow of the fluid through the microchannels, which could be either just elastic or elastic and permanent:

$$W_{FSI} = \frac{1}{2} \int_V \sum_{i,j} \sigma_{i,j} \varepsilon_{i,j} dV, \quad (5)$$

but preferably elastic if it is intended to develop a reusable composite.

The most conservative criteria for the design of the composite would be based on the criteria that all the energy should be dissipated by the viscous effect of the fluid flowing through the microchannels ($W_{Fluid}$). Therefore, as the rest of the terms are not considered in the design of the composite $W_{solid}$ $W_{FSI}$, the practical response of the resulting composite will definitely dissipate all the energy of the impact in practical terms. Then, according to this strategy, the optimal design of the microfluidic network will be based on the minimization of the following function:

$$F_{obj} = E_{impact} - W_{fluid} \quad (6)$$

Thus, for developing a composite based on this technology for a particular application it is required to be known the energy of the impacts aimed to be dissipated, as well as the environmental and light-weight restrictions in order to select the most adequate fluid properties (mainly the density and the temperature dependence of the rheological properties of the fluid). Then, by means of algorithm for optimal shape design, the optimal shape of the microfluidic network will be obtained. Starting from an initial estimate of the design variable vector ($X^0$), which parametrizes the shape of the flow geometry, the initial mesh is generated and the CFD simulation is undertaken. The objective function is then evaluated from the numerical solution, and this information is sent to the optimizer. This process is repeated for a number of design variable parameters, supplied by the optimized until the optimal shape is found. Different tools can be used for the parametrization of the shape, i.e. discrete approach (fictions load), Bezier and B-Spline curves, Uniform B-Splines (NURBS), feature-based solid modelling in CAD, etc. The mesh generator will generate a polyhedral mesh that approximates the geometric 3D domain. The flow solver can be either consider fluid structure interaction, if the solid material is very flexible, or not, if the solid material is very stiff. The optimizer to be used can be either based on genetic algorithm (GA), Artificial Neural Networks (ANN), Topology Optimization, CONDOR, etc.

In an embodiment, there is no limitation or restriction in terms of the shape of the microfluidic network, beyond the fact that it has to be of the scale of micrometers and it should be within the limit of the dimensions of the solid material which will contain it, i.e. the depth of the microchannels may be smaller than the thickness of the composite. Additionally, the fluid may remain tight, without any possibility of leakage. In the particular case of requiring a finer design, i.e. closer to the real behaviour, the other dissipative terms previously mentioned $W_{solid} + W_{FSI}$ should be added to the function to be optimized (Eq. 6). In this way, apart from optimizing the shape and size of the microchannel, it will be also optimized the distribution of microchannels across the solid material.

Thus, the optimal combination of microfluidics, complex fluids and solid mechanics result in a larger dissipation of energy than the one developed just by solid mechanics. It is expected that in the optimized configuration, the energy dissipation of the liquid reaches at least values of the order $W_{solid}$, which would give an extra protection of 100% with regards to only using the solid material. Thus, the protection would have been doubled without doubling the volume of the pad, which introduces an additional advantage of this technology.

The dominant variables of design in these equations are linked to the physico-chemical properties of the fluid (the density, viscosity and elasticity) and the solid (modulus of elasticity and Poisson's ratio).

Figure 3:
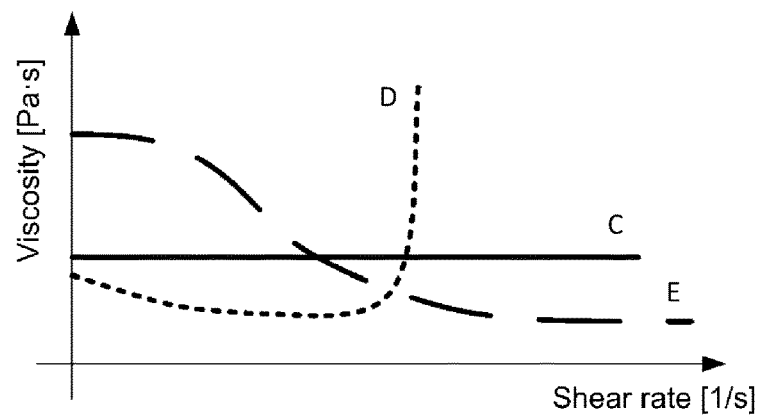
FIG. 3 graphically depicts the viscosity dependence with deformation rate for the three types of fluids suitable for this technology, i.e. Newtonian (C), shear thickening (D) and viscoelastic (E).

Regarding the fluid, although it will be preferable to use complex fluids (STFs and VEFs) in the implementation of this technology, due to the advantages introduced by their particular rheological behaviour, there may be applications in which Newtonian fluids could be used instead, due to economical or environmental reasons. Therefore, three types of fluids may be used in this disclosure, in particular Newtonian fluids, shear thickening fluids and viscoelastic fluids (FIG. 3).

The Newtonian fluids have constant viscosity and no elasticity. The viscosity can range from $10^{-3}$ Pa·s (distilled water at 20° C.) to $10^3$ Pa·s (supersaturated sucrose solution at 20° C.) and density may vary from 800 (oils) to 1500 kg/m$^3$ (supersaturated sucrose solution at 20° C.) at 20° C. In principle, any Newtonian fluid may be suitable for this technology, depending on the amount of the kinetic input to be dissipated. Nevertheless, if the working fluid is Newtonian, then $W_{elastic} + W_{Fn} = 0$ and Eq.3 will simplify as $W_{liquid} = W_{Visco}$.

Figure 4:
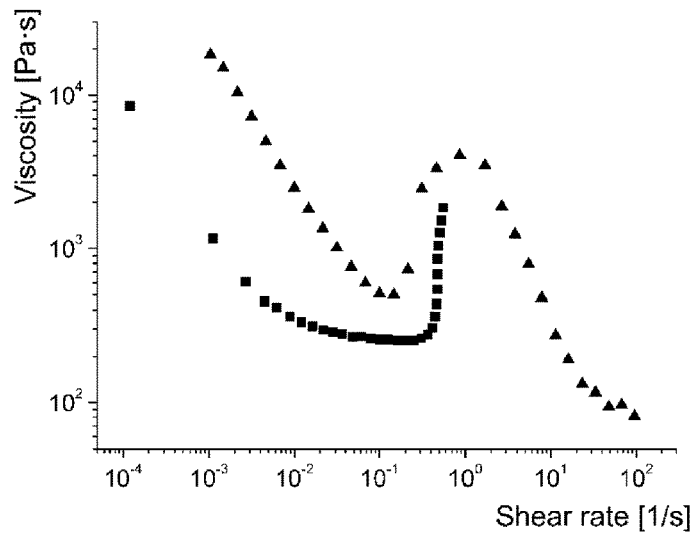
FIG. 4 is a data plot illustrating the viscosity increase with deformation rate for two different formulation (aqueous corn starch solution and a solution of precipitated calcium carbonate in glycerol) of shear thickening fluids at 20° C., wherein triangules represent corn-starch dispersion/water (45/55% wt) and squares represent precipitated calcium carbonate dispersion/glycerol (56/44% wt).

The shear thickening fluids (STFs), also known as dilatant fluid, is modelled as inelastic, the viscosity depends on the composition and shear rate. They typically show an increase on the viscosity over a critical shear rate value. That increase in the viscosity may vary from 0.1 to $10^4$ Pa·s depending on the composition of the fluid. The density will depend on the composition and concentration, but typically lower than 2000 kg/m$^3$. In principle, any formulation of shear thickening fluid available in the literature may be suitable for this technology, depending on the amount of the kinetic input to be dissipated. Nevertheless, for this technology it will be preferable to choose reversible shear thickening fluids, based on stable dispersions of colloidal particles. An example of STF is a suspension of corn-starch particles in water at high volume concentrations (~50% vol). Another example of STF is a suspension of precipitated calcium carbonate in glycerol, also at high volume concentration (FIG. 4). The critical deformation rate at which the fluid viscosity starts to increase can be adjusted by varying the particle size, the volume concentration or other parameters. In accordance with this technology, such shear thickening or dilatant fluids may be use to advantage fill the microfluidic networks to make a composite which progressively stiffens with the amount of applied external kinetic energy.

The viscoelastic fluids (VEFs) typically consist of a polymeric solution which viscosity is proportional to the molecular weight of the polymer used, scalling as $[n]\alpha$ $M^{0.5<a<0.8}$, depending on the relationship between solvent and polymer and the polymer concentration. Thus, viscosity depends also on the shear rate, exhibiting shear thinning behaviour (contrary to the shear thickening) may range from $10^4$ to $10^{-3}$ Pa·s, for increasing shear rates. Elasticity also depends on the molecular weight of the polymer, the concentration and the viscosity of the solvent, but can reach values up to several hours of relaxation times. Finally, density will also depend on the solvent and the polymer, but typically lower than 2000 kg/m$^3$. Boger fluids may be considered as a sub-class of viscoelastic fluids, having constant viscosity (no shear thinning nor shear thickening behaviour) and elastic behaviour. Therefore, ranges for viscosity, density and elasticity are similar to those already mentioned. In principle, any formulation of viscoelastic fluid available in the literature may be suitable for this technology, depending on the amount of the kinetic input to be dissipated.

The selection of the fluid to be used is done mainly considering the amount of energy to be dissipated by the fluid, but also by considering the durability of the composite at rest (shelf-life) and at work. In this sense, one should look for stable compositions for the range of temperature of the final application to avoid changes in the rheology of the fluid and subsequent changes in the properties of the composite. Thus, one should think about choosing a non-volatile solvent and fases with similar density in the case of solid-liquid dispersions, checking that crystallization or curing phenomena do not occur, etc.

The solid material is the part of the composite where the microfluidic network or pattern is embedded. In the an embodiment, the microfluidic network or pattern will be embedded in one sheet of solid material, then filled by the working fluid and closed with another sheet of solid material. The nature of the solid material corresponding to the lid can be the same or different to the nature of the solid material where the microchannels are embedded. Although the solid material conforming the lid of the microchannels can be either deformable or rigid, the system will work better with a deformable lid, especially under impacts. Nevertheless, it is indeed mandatory that solid material hosting the microfluidic network deform reversibly under impact and allow the transmission of part of the external vibration to the fluid. Otherwise, if the solid material hosting the microfluidic pattern was rigid, it would not deform under impact, the fluid would not flow under impact and the fluid would not dissipate part of the external kinetic energy.

Figure 5:
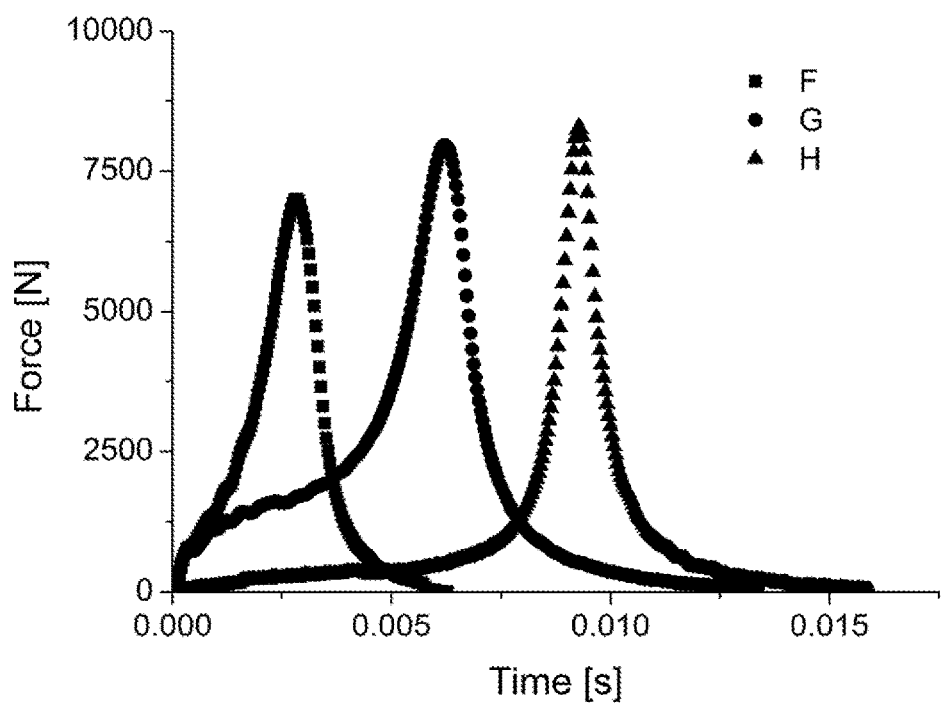
FIG. 5 graphically depicts the force-time dependence for the three types of solid materials suitable for this technology, i.e. microagglomerated cork (6 mm), expanded polystyrene (20 mm) and expanded polypropylene (20 mm), wherein F represents cork, G represents expanded polypropylene with a density of 45 kg/m$^3$ (EPP45) and H represents expanded polystyrene with a density of 15 kg/m$^3$ (EPS15).

This technology is thought to be used with any solid material that allow to engrave, carve, stamp, incise, or whatsoever technique, the microfluidic network or pattern in such a way that the filling-fluid will not leak out. Therefore, it will not work for open-cell cellular materials or porous matrix consisting of an interconnected network of cells made from whatsoever material (polymer, composites, metal, fibers, etc.). On the contrary it will work for closed-cell cellular materials, which additionally show resilient properties with good performance under impacts, like microagglomerated cork, expanded polystyrene or expanded polypropylene. FIG. 5 graphically depicts the force-time dependence for these latter solid materials as a result of an impact. In the case of microagglomerated cork, it must be noticed that there are interstitial pores between the bindered cork granules through which the fluid can leak out. Therefore, the smaller the size of the granules, the smaller will be the size of the interstitial pores and the tighter will be the microfluidic channels. The surface tension of the working fluid will determine the maximum size allowed for the interstitial pore to prevent it from leaking out of the microchannels. Thus, microagglomerated cork with granule sizes smaller than 5 mm are recommended. Nevertheless, additional coatings can be applied to avoid this scenario.

Figure 6:
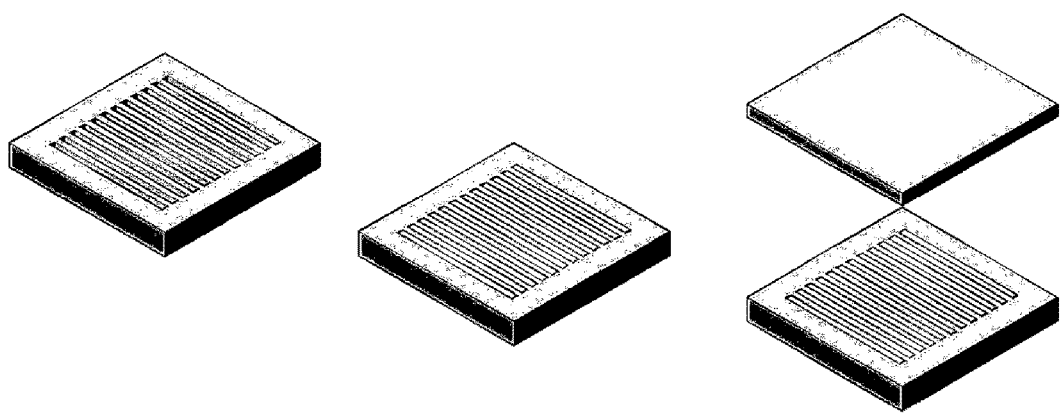
FIG. 6 schematically illustrates an embodiment of the disclosure wherein a fluid is filling a pattern of straight microchannels not interconnected and embedded on a sheet of solid material and covered with another sheet of solid material.
Figure 7:
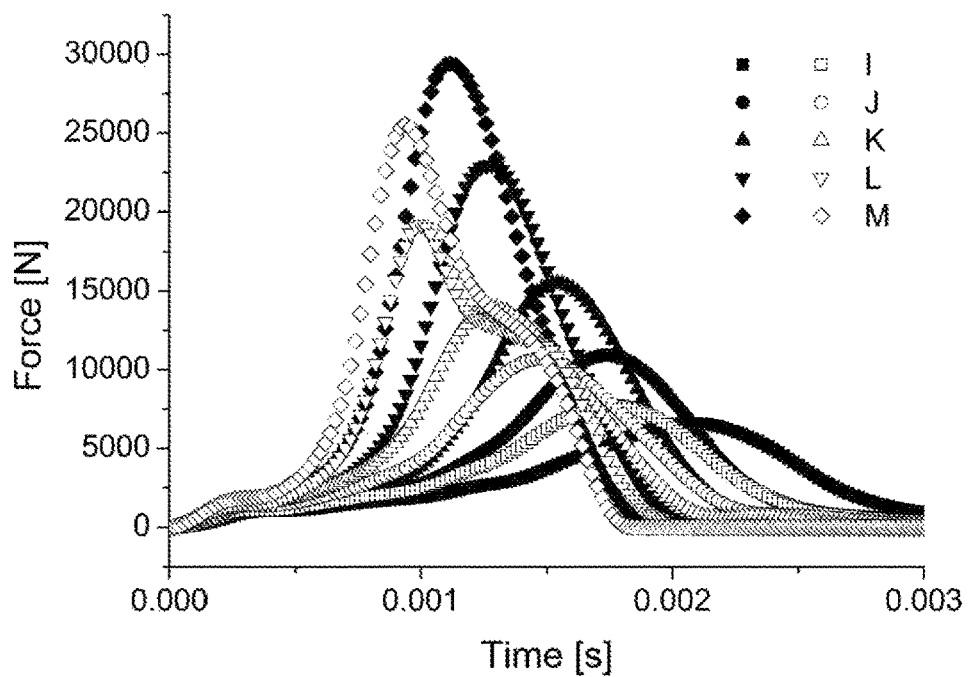
FIG. 7 is a data plot illustrating the force-time response resulting from different impact energies on a microagglomerated cork composite reinforced with a dispersion of precipitated calcium carbonate in glycerol (at 56% wt) filling a pattern of straight microchannels having the same depth, width, length and distance between them. All the experiments were developed at 20° C. Filled symbols represent the response of the sole lamina of cork under impact and open symbols represent the response of the composite, wherein I represents 5 J, J represents 7.5 J, K represents 10 J, L represents 15 J, M represents 20 J.
Figure 8:
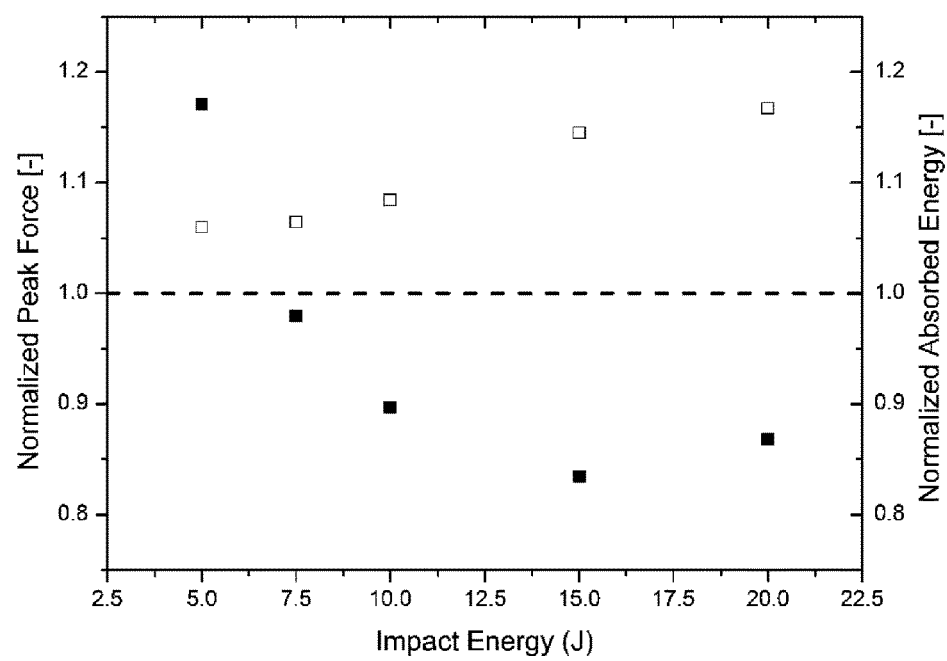
FIG. 8 represents the degree of protection in terms of normalized peak forces (left axis) and normalized energy dissipated (right axis) of the composite reinforced compared with the sole laminar sheet of cork. The composite was filled with a dispersion of precipitated calcium carbonate in glycerol at 56% wt filling a set of straight microchannels (750 µm×700 µm×50 mm) separated between them by 500 µm and embedded in the same laminar sheet of cork. Impact tests were performed at different impacting energy from 5 J to 20 J and at 20° C., according to the British Standards BS EN 13061:2009. Filled symbols correspond to the response of the sole sheet of cork, while the empty symbols correspond to the composite.

As it was mentioned above, the shape of the geometry of the microfluidic network or pattern will result from an optimization process, and therefore it can be any old. Although the shape of the microchannels will result from the numerical optimization, it has been reported in the literature that contraction-expansions and bindering paths enlarge $\Delta P_{elastic}$ values, but larger values can be reached with sawtooth shapes, and even larger if objects are blocking these sawtooth paths. Nevertheless, regarding the dimensions of the microchannels, they typically will have dimensions of either depth or width below 1 mm, while there is no limitation in the length of the microchannels, as long as it fits inside the solid material domain. FIG. 6 schematically illustrates an embodiment of the disclosure wherein a fluid is filling the microfluidic network embedded on a sheet of solid material and covered with another sheet of solid material. In particular, it is shown the simplest possible pattern, a set of individual straight microchannels with rectangular cross-section. As it can be observed in FIG. 7, for an embodiment of this technology consisting of straight microchannels with 750 µm width, 700 µm depth and 50 mm length, separated by 500 µm and embedded in a 2 mm thick laminar sheet of microagglomerated cork with granular sizes between 0.5 and 2 mm and covered with a 1 mm thick autoadhesive laminar sheet of microagglomerated cork with granule sizes of 0.5 mm, when subjected to an impact following the British Standard for protective clothing (BS EN 13061:2009), the shear thickening fluid will only be activated above a certain amount of impact energy. The increment in the protection compared with the performance of the sole laminar sheet of cork, can be analysed twofold: A) the reduction in the maximum force peak and the total energy dissipated. FIG. 8 shows that the increment in the protection provided by the sole lamina of microagglomerated cork for impacts are larger for impacts beyond 10 J, considering the embodiment represented in FIG. 7.

Figure 9:
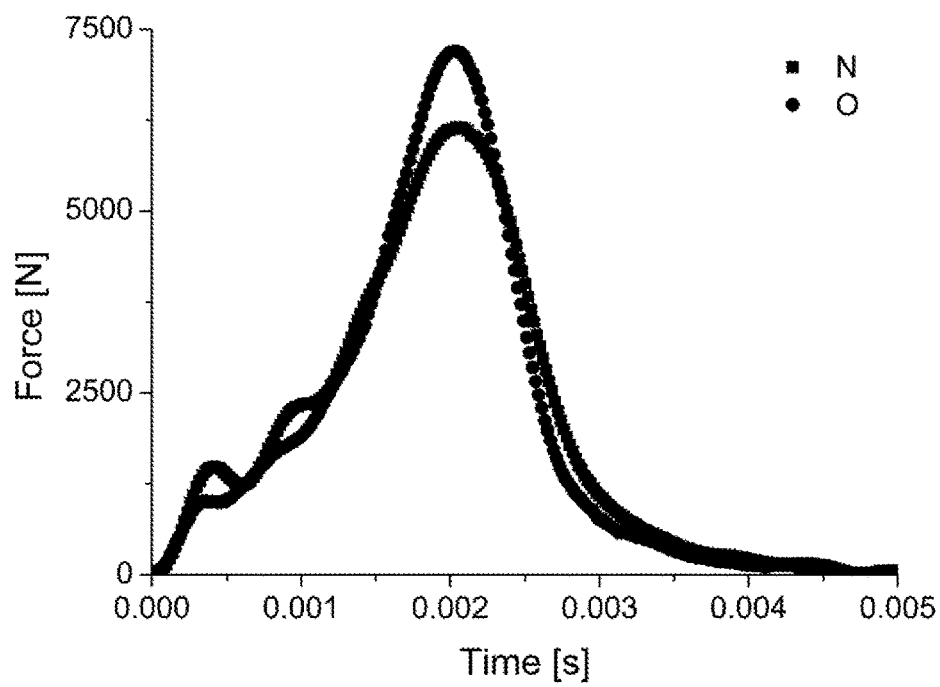
FIG. 9 is a data plot illustrating the force-time response resulting from an impact test of microagglomerated cork reinforced with a dispersion of precipitated calcium carbonate in glycerol (at 56% wt) filling a pattern of straight microchannels. All the experiments were developed at 20° C., wherein N represents cork and O represents the composite with w500/d300.

FIG. 9 is a data plot illustrating the force-time response resulting from an impact test of 5 J on composites resulting of a particular embodiment of this technology consisting of microagglomerated cork with a dispersion of precipitated calcium carbonate in glycerol (at 56% wt) filling a pattern of straight microchannels having 700 µm depth, 500 µm width, 50 mm length and separated 300 µm between them. The microchannels were embedded in a 2 mm thick laminar sheet of microagglomerated cork with granular sizes between 0.5 and 2 mm and covered with a 1 mm thick autoadhesive laminar sheet of microagglomerated cork with granule sizes of 0.5 mm. In this way it can be observed that when the configuration of the pattern is not optimized for the impacting energy, the response of the composite is worsened with regards to the response of the sole solid material.

Figure 10:
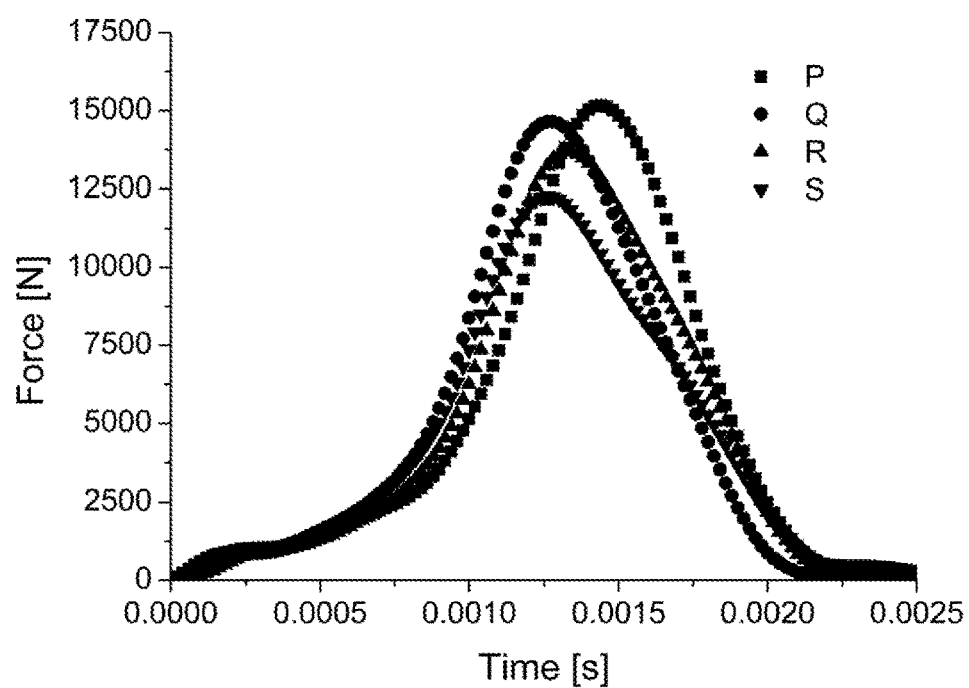
FIG. 10 is a data plot illustrating the force-time response resulting from an impact test of microagglomerated cork reinforced with a dispersion of precipitated calcium carbonate in glycerol (at 56% wt) filling different patterns microchannels, i.e. straight, splines and grid, having all of them the same depth (700 µm), width (500 µm), length (50 mm) and separated between them by 500 µm. Impact tests were performed at 10 J impacting energy and at 20° C., according to the British Standards BS EN 13061:2009, wherein P represents cork, Q represents straight, R represents splines and S represents grid.

FIG. 10 is a data plot illustrating the force-time response resulting from an impact test of 10 J on composites resulting of a particular embodiment of this technology consisting of microagglomerated cork reinforced with a dispersion of precipitated calcium carbonate in glycerol (at 56% wt) filling different microfluidic patterns, i.e. individual straight microchannels, straight microchannels crossing forming a grid and individual waving microchannels. They all have in common the depth (700 μm), the width (500 μm), the length (50 mm) and the distance between them (500 μm). Also in all cases, the microchannels were embedded in a 2 mm thick laminar sheet of microagglomerated cork with granular sizes between 0.5 and 2 mm and covered with a 1 mm thick autoadhesive laminar sheet of microagglomerated cork with granule sizes of 0.5 mm. Again it can be observed that just by changing the shape of the microchannels, the degree of improvement on the response of the composite to an external impact can be tunned with regards to the response of the solid material.

Figure 11:
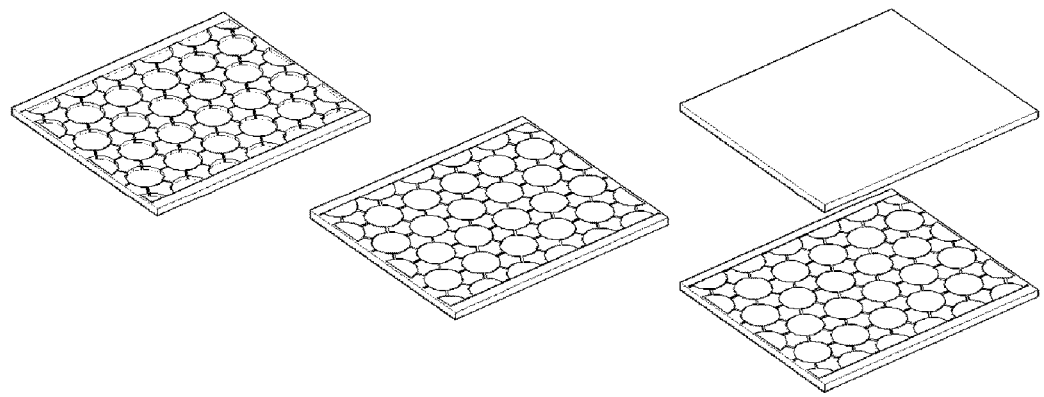
FIG. 11 illustrates an embodiment of the disclosure wherein a fluid-filled-microfluidic network consisting of cylindrical reservoirs interconnected by microchannels is embedded into a solid material and covered with another sheet of solid material.
Figure 12:
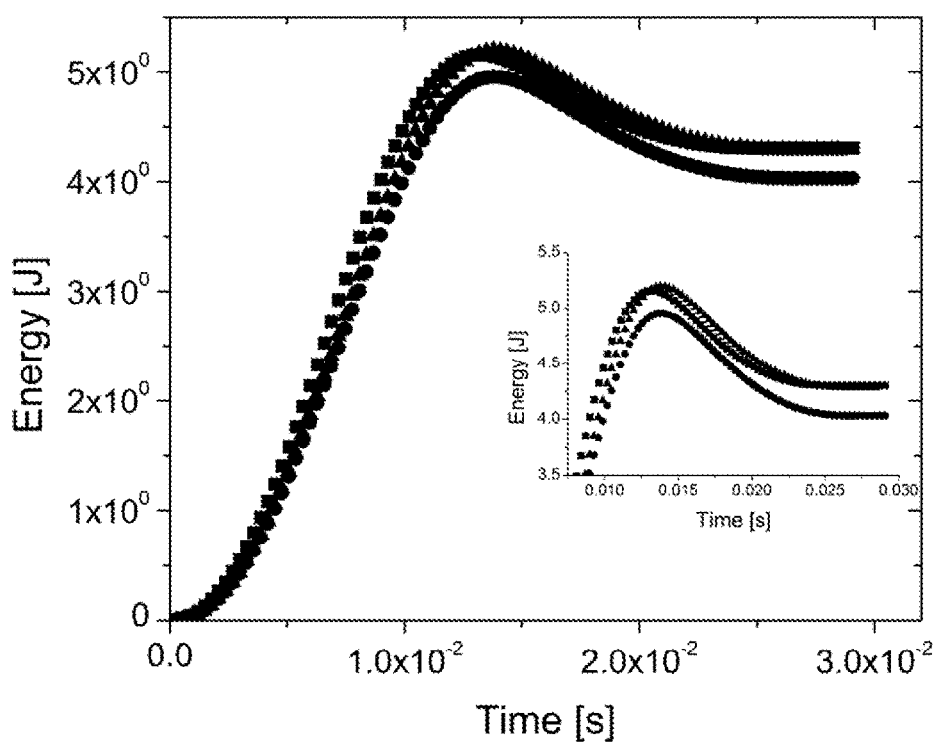
FIG. 12 is a data plot illustrating the energy-time dissipated resulting from an impact test of microagglomerated cork and microagglomerated cork reinforced with an aqueous dispersion of corn starch (at 45% wt) filling different microfluidic networks (as illustrated in FIG. 11). Square symbols correspond to the response of the sole lamina of microagglomerated cork. Circle symbols correspond to the composite having a microfluidic network with microchannels having 100 µm width, 700 µm depth and reservoirs with a radius of 1 mm. Triangle symbols correspond to the composite having a microfluidic network with microchannels having 200 µm width, 700 µm depth and reservoirs with a radius of 2 mm. All the experiments were developed at 20° C.

FIG. 11 illustrates an embodiment of the disclosure wherein a solid materials host a fluid-filled-microfluidic network consisting of cylindrical reservoirs interconnected by microchannels and covered with another sheet of solid material. FIG. 12 is a data plot illustrating the energy-time response resulting from an impact test of 5.25 J on composites resulting of a particular embodiment of this technology consisting of microagglomerated cork reinforced with an aqueous dispersion of corn starch (at 45% wt) filling different microfluidic networks (as illustrated in FIG. 11), having the same depth (700 μm), but different the width and the radius of the reservoirs. Also in all cases, the microchannels were embedded in a 2 mm thick laminar sheet of microagglomerated cork with granular sizes between 0.5 and 2 mm and covered with a 1 mm thick autoadhesive laminar sheet of microagglomerated cork with granule sizes of 0.5 mm. Again and also in the case of microfluidic networks, it can be observed that just by changing the dimensions of the microchannels, the response of the composite to an external impact can be improved or worsened with regards to the response of the solid material.

Figure 13:
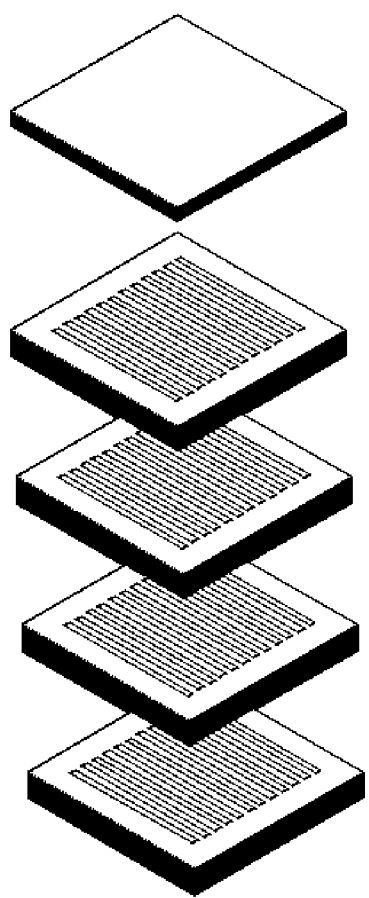
FIG. 13 schematically illustrates an embodiment of the disclosure wherein different layers of solid materials reinforced with fluid-filled-microfluidic pattern/network (particularly, each layer has a different pattern/network) and finally covered with another sheet of solid material.

Alternatively, another embodiment of this technology may consist of piling-up different layers of these optimized composites that can be combined in order to give the protection to a wider range of energy impacts (FIG. 13). In this way, the outer layer of the final composite will be optimized to cover the smaller range of impact energy, while the deeper layer of the final composite will be designed to protect from the larger range of impact energy.

The foregoing drawings, discussion and description are illustrative of particular embodiments of the composites resulting from the application of this technology, but are not meant to be limitations upon the practice thereof. The optimal combination of solid material, microfludic network/pattern and filling fluid will depend on the particular conditions, restrictions and limitations intrinsic to the problem to be solved by the application of this technology. It is the following claims, including all equivalent, which define the scope of the disclosure.

The disclosure should not be seen in any way restricted to the embodiments described and a person with ordinary skill in the art will foresee many possibilities to modifications thereof.

The above described embodiments are combinable. The following claims further set out particular embodiments of the disclosure.

The invention claimed is:

1. A composite layer material for dampening external dynamic load, comprising: at least a support layer of a resilient material, the support layer having recessed fluid-tight microchannels comprising a fluid, wherein the microchannel section and fluid viscosity dampens the external dynamic load by constricted fluid flow through the microchannels, wherein the at least one support layer comprises an impermeable resilient solid material selected from the group consisting of: cork, expanded polystyrene, expanded polypropylene, ethylene vinyl acetate, and combinations thereof.

2. The composite layer material according to claim 1, wherein the fluid is a shear thickening fluid, a viscoelastic fluid, or a combination thereof.

3. The composite layer material according to claim 1, wherein the microchannels are interconnected.

4. The composite layer material according to claim 1, wherein the support layer further comprises recessed fluid-tight pockets interconnected with the microchannels.

5. The composite layer material according to claim 4, further comprising a second layer over the microchannels and/or pockets for retention of the fluid.

6. The composite layer material according to claim 1, wherein the microchannels extend in two planar directions of the support layer.

7. The composite layer material according to claim 1, comprising a plurality of support layers.

8. The composite layer material according to claim 1, wherein the microchannels are either engraved microchannels, carved microchannels, or stamped microchannels.

9. The composite layer material according to claim 1, wherein the microchannels comprise a depth between 0.01 a 10 mm.

10. The composite layer material according to claim 1, wherein the microchannels comprise a width between 0.01 a 10 mm.

11. The composite layer material according to claim 1, wherein the fluid has a viscosity is between $10^{-3}$ and $10^4$ Pa s at 20° C.

12. The composite layer material according to claim 1, wherein the fluid has a density between 800 and 2000 kg/m$^3$ at 20° C.

13. The composite layer material according claim 1, wherein the fluid is a shear thickening fluid and wherein the shear thickening fluid is selected from the group of: concentrated dispersions of: corn starch, precipitated calcium carbonate, aerosil, fumed silica, silica, and mixtures thereof.

14. The composite layer material according to claim 1, wherein the fluid is a viscoelastic fluid and wherein the viscoelastic fluid is selected from the group of: concentrated solutions of: polyacrylamide, polyethylene oxide, polyisobutylene, and mixtures thereof.

15. The composite layer material according to claim 1, wherein the support layer comprises a thickness between 1 a 10 mm.

16. The composite layer material according to claim 1, further comprising a second layer having a thickness between 0.1 a 10 mm.

17. The composite layer material according to claim 1, further comprising a second layer over the support layer, wherein the second layer comprises an adhesive.

18. A composite layer material for dampening external dynamic load, comprising: at least a support layer of a resilient material, the support layer having recessed fluid-tight microchannels comprising a fluid, wherein the microchannel section and fluid viscosity dampens the external dynamic load by constricted fluid flow through the microchannels, wherein the resilient material is an agglomerated material.

19. The composite layer material according to claim 18, wherein the agglomerated material comprises cork having a granule size between 0.1 a 5 mm.

* * * * *